(No Model.)

J. SEEBERGER.
Car Brake and Starter.

No. 240,854.   Patented May 3, 1881.

Attest:

Inventor:
Joseph Seeberger (No Model.)
2 Sheets—Sheet 2.
J. SEEBERGER.
Car Brake and Starter.
No. 240,854.
Patented May 3, 1881.
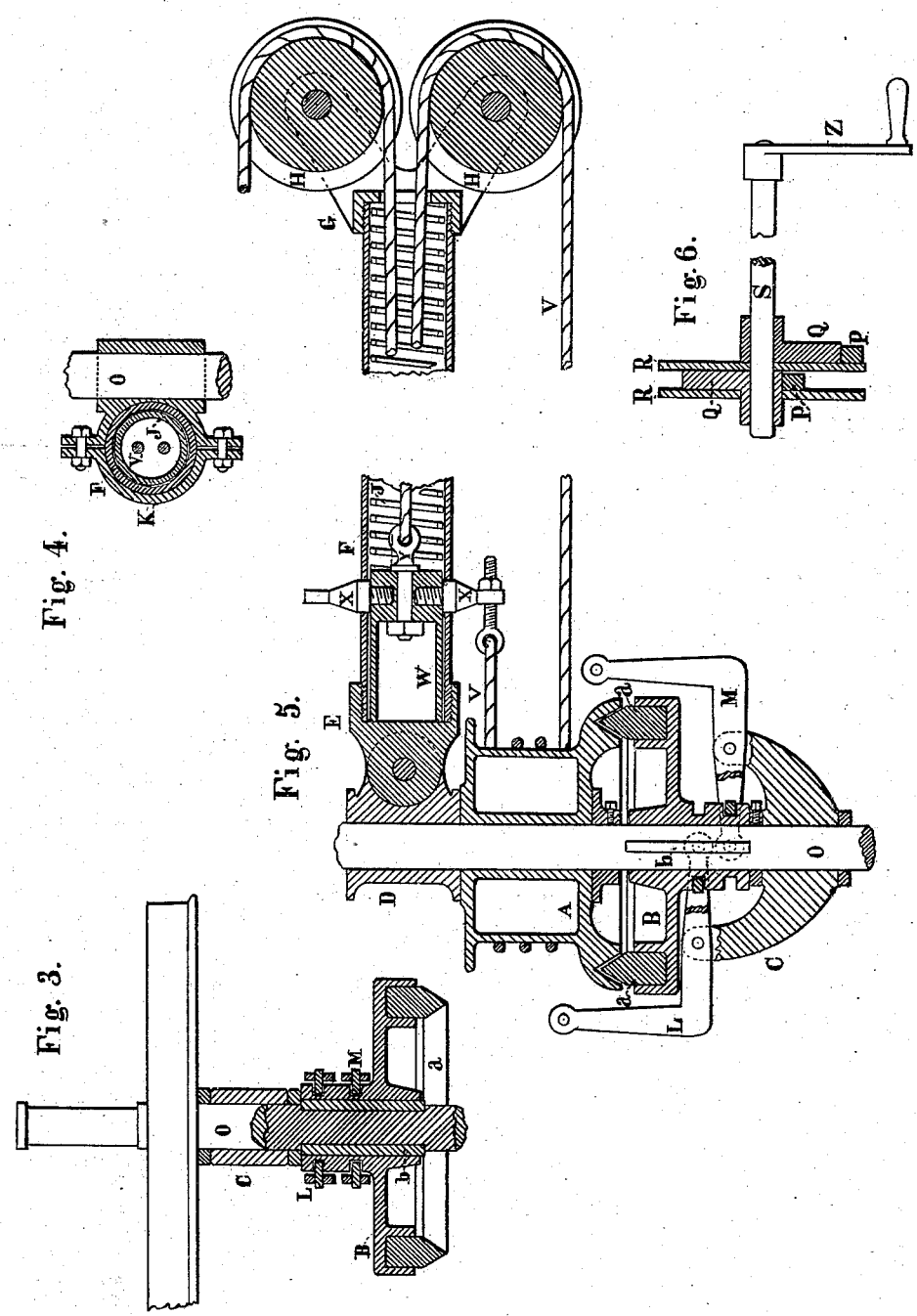
Attest:
Inventor:
Joseph Seeberger

UNITED STATES PATENT OFFICE.

JOSEPH SEEBERGER, OF WEST TROY, ASSIGNOR OF ONE-HALF TO GEORGE H. STARBUCK, OF TROY, NEW YORK.

CAR BRAKE AND STARTER.

SPECIFICATION forming part of Letters Patent No. 240,854, dated May 3, 1881.

Application filed January 12, 1881. (No model.)

*To all whom it may concern:*

Be it known that I, JOSEPH SEEBERGER, of West Troy, county of Albany, and State of New York, have invented certain new and useful Improvements in Car Starters and Brakes, of which the following is a full, clear, and exact description, reference being had to the accompanying drawings, and to the letters of reference marked thereon.

My invention has relation to that class of devices intended to obviate the considerable strain required to be exerted by the horses (or whatever motive power may be used) in starting a vehicle, as a car, or in overcoming its inertia, whether of rest or of diminished velocity.

The object of my invention is to produce a simple, cheap, and effective car starter and brake arrangement, which may be easily operated from either end of the vehicle, and in which the power required to arrest the motion of the vehicle is stored up in a suitable spring, to be afterward employed in giving either a forward or backward rotary motion to the wheels or to arrest their motion wholly or partially, (forming an effective brake,) as may be required; and to this end my invention consists in certain novel and useful combinations or arrangements of parts, peculiarities of construction, and principles of operation, all of which will be hereinafter first fully described, and then pointed out in the claims.

Figure 1:
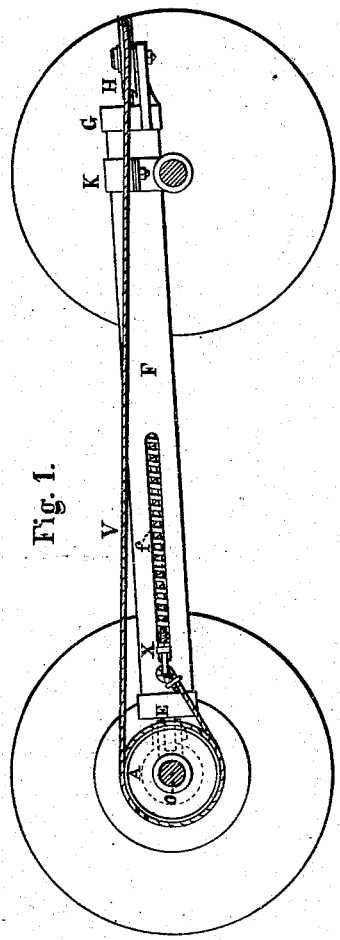
Figure 2:
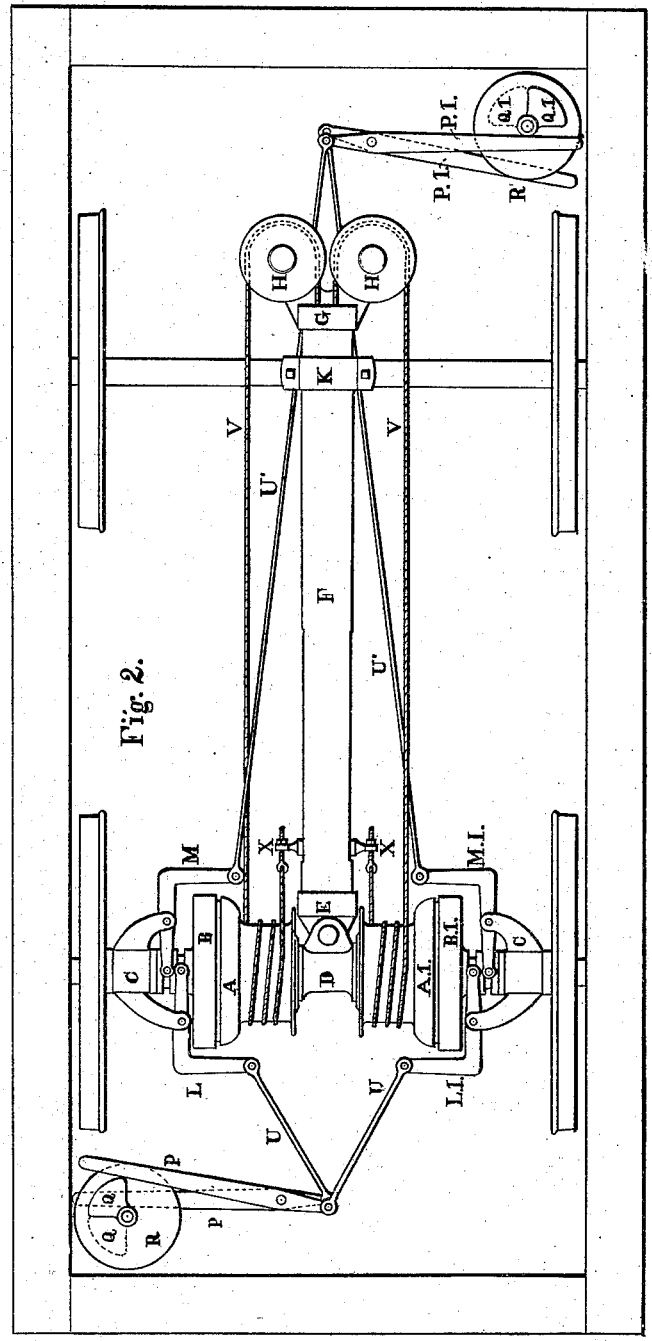

In the accompanying drawings, Figure 1 is a side elevation of the spring-containing tube mounted upon the forward and rear axles of an ordinary street-car; and Fig. 2 is a plan view, showing my improved apparatus complete and as applied to the running-gear of an ordinary car, in condition to be operated by the brake-lever at either end of said car. Fig. 3 is a horizontal section and partial plan of one end of one of the car-axles, showing the shifting friction-clutch applied thereon. Fig. 4 is a cross-section, showing the means of connecting the spring-holding tube with the forward axle, or axle which does not support the friction-clutches. Fig. 5 is a horizontal section through the spring-holding tube, showing, also, one of the winding-drums and the friction-clutch applied in connection therewith, the central portion of the tube being omitted for convenience of illustration. Fig. 6 is a partial section and elevation, showing the construction of the lever and attachments for communicating the desired movements in the starting and braking apparatus.

In all these figures like letters of reference, wherever they occur, indicate corresponding parts.

O is one of the car-axles, suitably turned for the reception of the drums and friction appliances, and to which the wheels are securely applied. The two drums A and A' are fitted to this axle so as to work loosely thereon, and each drum has a groove formed in the flange thereof for the reception of the friction-block $a$, which is attached to the movable flange B. The flanges B B' rotate with the shaft or axle, being carried with it by suitable feathers $b$, which allow a lateral movement of flanges B B', so as to bring blocks $a$ in or out of contact with the friction-surfaces on the drums. The hubs of the flanges B B' are turned or grooved to receive the shifters.

C C are double-clutch shipper-holders, fitting loosely upon the shaft or axle, with projections forward and back, forming supports and fulcrums for the shifting-levers L L' and M M'.

D is a support for the spring-holding tube F, which is jointed, as shown at E, and the axle O revolves freely within the support or collar D. The opposite end of tube F is supported by the box K, which embraces the other axle and is loosely fitted thereon, so that the axle may revolve without disturbing the box. The box K also embraces tube F, as plainly shown, so that said tube has a lateral motion with respect to the car-axle, or a motion in the direction of the length of the tube, so that said tube may easily conform to the varying motions of the car.

At the outer end of tube F is fitted a double-sheave frame, G, carrying two sheaves, H H, forming guide-sheaves for the chains, cables, or cords V V.

Within tube F is a piston, W, fitted loosely, so as to work freely inside the tube, and provided with two projecting-arms, X X, extending through the slots in opposite sides of the tube. The actuating-spring J, of any convenient construction, of steel, bent spirally, as shown, or of rubber, or of both steel and rubber combined, bears against the piston W at one end of the tube, and at the other is held by some suitable means, as by the screw-cap applied as shown. The chains or cords V V are fastened to the movable piston W by the eyebolt Y, passing thence through the spring over the sheaves H H, and back to the drums A A', around which they are wound two or three times, (sufficient to afford a firm gripe upon the drums,) and the ends are then fastened to the arms X X projecting from the piston. As will be observed, the chains or cords V V are passed around the drums, one on the upper side and the other on the under side, so as to draw by the operation of the friction, when thrown into gear, in opposite directions.

U U and U' U' are rods connecting the shifting-levers L L' and M M' with the levers P P and P' P', said levers being fastened or secured, by any suitable device forming a fulcrum for the same, to the under side of the car-body frames.

S is the brake-wheel shaft, extending from the under side of the car-body upward to receive the brake-handle Z, to be operated by the driver.

On the lower end of shaft S are two cams, as shown at Q Q and Q' Q', one located directly above the other, with its projecting part one-quarter of a turn in advance of the other.

R R and R' R' are supporting-plates for keeping the ends of levers P and P' in proper place.

The operation of the brake as shown is very simple, and under the perfect control of the driver, requiring only such motions of the handle as are familiar to any one who has operated the brake of an ordinary horse-car.

In the drawings, the cam Q is shown as thrown in position to act on the lever P, which, in turn, controls lever L', by which the flange B' is moved along upon the shaft and brought into contact with drum A', coupling said drum and flange, so that both must revolve together and with the wheels of the vehicle. The effect of this is to wind the chain or cord V around the drum, compressing the spring J, and moving piston W forward in the tube F. The arms X X are carried forward with the piston W, which is permitted by the before-described slots in the sides of the tube. The compression of the spring retards the motion of the car or brings it to a standstill. The forward movement of the arms X X unwinds the chain or cord on the opposite drum, keeping it taut at all times, and preventing any slack in the same when the car is stopped. A further forward movement or quarter-turn of the brake-handle throws the other lever, P, forward, which throws the friction on the opposite side into contact with its corresponding drum.

If it be desired to utilize the power accumulated in the spring to force the car forward, or to start it again in the same direction in which it had been previously moving, the lever or handle Z is brought forward still another quarter-turn, when the cam first in action releases the friction from contact, and the opposite drum being operated upon by the spring, the car is projected forward.

Should it be desired, as often occurs on a down grade, to retard rather than accelerate the motion of the car, the lever Z is carried back a quarter-turn, which releases the last friction brought in contact with the drum, and the effect of the action of the spring is to give the car a backward motion; or the lever may be so carried or turned as to ease the friction, and thus bring any desired portion of the braking power to act from its full force to naught, according to the requirements of the case. By moving the lever or handle Z a further quarter-turn or a full turn from the starting-point all friction is released and the car permitted to move freely.

Should it be desired, as often occurs, to operate the brake instantly from the position in which the frictions are out of gear or contact with their drums, the lever Z is carried forward a half-turn, when both frictions are brought into operation, and, one working against the other, an effective brake is opposed to the motion of the car.

The brake may be operated from either end of the car with equal effect and with equal facility.

It will also be observed that one lever or handle, Z, is all that is required upon that class of cars in which the horses or motive power are intended to be coupled or attached at only one end.

In the improved device, constructed substantially as shown, no part of it, excepting the handle Z and its shaft and attached cams and levers P and P', is applied to the car-body, the drums, frictions, levers, clutch-shippers, holders, and spring-supporters being all applied and supported upon the axles of the wheels or running-gear, in consequence of which no strain is brought upon the journal-boxes, and the vibrations or positions of the car-body do not affect the working of the brake or starter. The shifters and levers are so arranged and in such relative positions that either or both clutches may be thrown in action and the car held stationary without the intervention of ratchets, pawls, dogs, or other such appliances.

When constructed and arranged to operate substantially in accordance with the foregoing explanations the improved arrangement admirably answers the several purposes and objects of the invention, as previously stated. It combines all the advantages of the most approved forms of braking appliances, with an effectual means of starting the vehicle by utilization of the power stored up in the spring by the action of the braking force.

The parts are simple and not liable to get out of order, and may be easily applied upon any of the ordinary forms of cars now in use.

Having now described the construction and operation of my improved device, what I claim as new, and desire to secure by Letters Patent, is—

1. The combination of the two friction-drums A A', working loosely upon the car-axle, and having the cords wound in opposite directions, the frictions B B', clutch-shipper holders C C, levers M M' and L L', and means for operating the same from either end of the vehicle, substantially as shown and described.

2. The combination, with the spring-holding tube F, of the sheave-frame G and guiding-sheaves H H mounted thereon, and adapted to operate substantially as explained.

3. The combination, with the collar D, mounted upon the axle, of the spring-holding tube F, jointed or hinged upon said collar, substantially as and for the purposes set forth.

4. In combination with the spring-holding tube F, hinged as described, and carrying the guide-sheaves for the working chains or cords, the piston W, having projecting arms X X, for attachment of said cords or chains, the arms passing through slots in the sides of the tube, substantially as shown and described.

5. The combination of friction-drums A A', flanges B B', collar D, tube F, support K, fulcrums C C, and operating-levers, the tube having a vertical and longitudinal movement in its bearings, and all supported upon the car-axles independently of the car-body, substantially as and for the purposes set forth.

6. In combination with the actuating-levers P P or P' P', the corresponding cams mounted upon the vertical shaft S, one at a higher level than the other, and one in advance of the other, the shaft being provided with a lever or handle, Z, substantially as shown and described.

7. The combination of the guide-plates R R, cams Q Q, levers P P, and the operating-shaft S, having suitable handle Z, substantially as shown and described.

8. The combination of levers P P, rods U U, levers L L', supports C C, and the movable frictions B B', substantially as shown and described.

9. In an apparatus of the character herein described, the combination, with the spring-actuated piston, movable in the hinged and collared tube, of the two connected cords or chains wound in opposite directions about the two independent friction-drums, said drums being capable of being clutched to their supporting-axle, together or separately, for braking, stopping, or starting the car, substantially in the manner and for the purposes set forth.

10. In an apparatus of the character herein specified, the spring-supporting tube hinged at one end to one axle and collared loosely upon the other, substantially as shown, so as to conform to the various motions and positions of the running-gear, in the manner and for the purposes set forth.

11. In combination with the spring located in the tube, the piston actuated by said spring, the two independent cords or chains attached to the piston and running over the guiding-sheaves at the front of the tube, the independent friction-drums having the cords wound thereon in opposite directions, and the friction-clutches adapted to be operated from one end of the car or vehicle to brake, stop, or start the same, substantially as shown and described.

12. The herein-described combined car starter and brake, composed of the independent drums, the oppositely-wound cords or chains, the spring-actuated pistons carrying said cords, the spring, the spring-containing tube mounted upon the axles, as explained, the frictions and friction-shippers, and the connected rods, levers, and operating-cams, the whole being constructed and arranged to operate substantially as shown and described.

In testimony that I claim the foregoing I have hereunto set my hand in the presence of two witnesses.

JOSEPH SEEBERGER.

Witnesses:
JAMES W. STARBUCK,
F. F. HEMENWAY.